(12) United States Patent
Han

(10) Patent No.: US 11,766,749 B2
(45) Date of Patent: Sep. 26, 2023

(54) DEVICE FOR SUPPLYING BOLT

(71) Applicant: Atlas Copco Korea Co., Ltd., Seongnam-si (KR)

(72) Inventor: Jaemin Han, Hwaseong-si (KR)

(73) Assignee: Atlas Copco Korea Co., Ltd., Seongnam-si (KR)

( * ) Notice: Subject to any disclaimer, the term of this patent is extended or adjusted under 35 U.S.C. 154(b) by 0 days.

(21) Appl. No.: 17/455,272

(22) Filed: Nov. 17, 2021

(65) Prior Publication Data

US 2022/0152754 A1 May 19, 2022

(30) Foreign Application Priority Data

Nov. 17, 2020 (KR) .................. 10-2020-0153616

(51) Int. Cl.
*B23P 19/00* (2006.01)
*B23P 19/06* (2006.01)
*B25B 23/06* (2006.01)

(52) U.S. Cl.
CPC ............. *B23P 19/006* (2013.01); *B23P 19/06* (2013.01); *B25B 23/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,762,192 A | * | 6/1930 | Peirce ................... | B23P 19/06 470/49 |
| 3,750,257 A | * | 8/1973 | Berecz .................. | B25B 23/06 81/433 |
| 4,148,401 A | | 4/1979 | Kautetzky | |
| 4,926,719 A | * | 5/1990 | Kross ..................... | B25B 23/08 81/433 |
| 6,813,977 B2 | * | 11/2004 | Goodhue .............. | B25B 23/06 81/433 |
| 2011/0160905 A1 | | 6/2011 | Asamizu et al. | |
| 2011/0245052 A1 | * | 10/2011 | Ohno ..................... | B23P 19/06 483/18 |

(Continued)

FOREIGN PATENT DOCUMENTS

| | | | | |
|---|---|---|---|---|
| CN | 104440746 A | * | 3/2015 | ............ B23P 19/001 |
| CN | 111206785 A | | 5/2020 | |

(Continued)

OTHER PUBLICATIONS

Translation of JP-06218637-A (Year: 1994).*

(Continued)

*Primary Examiner* — Matthew P Travers
(74) *Attorney, Agent, or Firm* — Perkins Coie LLP

(57) ABSTRACT

Disclosed is a device for supplying bolts having an improved bolt supply mechanism so as to enhance work speed and productivity as well as to prevent various interferences and troubles caused by driving a robot. The device for supplying bolts comprises a rotary magazine that indexes a plurality of bolts; and a nut runner having a driving bit that picks up a bolt in the rotary magazine one by one and performs a driving operation, wherein the rotary magazine has a turret that houses a plurality of bolts in a circumferential direction and positions a bolt in the nut runner by rotation.

13 Claims, 16 Drawing Sheets

(56) References Cited

U.S. PATENT DOCUMENTS

| | | | | |
|---|---|---|---|---|
| 2016/0031051 A1* | 2/2016 | Izumiya | ........... | B25J 11/00 |
| | | | | 81/57.37 |
| 2018/0222696 A1* | 8/2018 | Schneider | ........... | B23P 19/006 |
| 2020/0001412 A1* | 1/2020 | Miyake | ........... | B23P 19/069 |
| 2020/0009710 A1* | 1/2020 | Bethoux | ........... | B25B 23/06 |
| 2021/0094170 A1* | 4/2021 | Park | ........... | B25J 15/0608 |
| 2021/0371212 A1* | 12/2021 | Park | ........... | B23P 19/069 |

FOREIGN PATENT DOCUMENTS

| | | | |
|---|---|---|---|
| DE | 3530230 A1 | 3/1987 | |
| DE | 202016103166 U1 | 9/2017 | |
| JP | 1993345251 A | 12/1993 | |
| JP | 06-218637 A | 8/1994 | |
| JP | 06218637 A * | 8/1994 | |
| JP | 1994218637 A | 8/1994 | |
| JP | 2006142415 A | 6/2006 | |
| JP | 2010142882 A | 7/2010 | |
| JP | 2016034687 A | 3/2016 | |
| JP | 2017001125 A * | 1/2017 | |
| JP | 2017001125 A | 1/2017 | |
| WO | WO-2011068780 A2 * | 6/2011 | ......... A61B 17/8888 |

OTHER PUBLICATIONS

Translation of JP-2017001125-A (Year: 2017).*
Office Action from Japanese Patent Application No. 2021-182646 dated Jul. 18, 2023 (5 pages).

* cited by examiner

DEVICE FOR SUPPLYING BOLT

CROSS REFERENCE TO RELATED APPLICATIONS

This application claims the priority to and benefit of Korean Patent Application No. 10-2020-0153616, filed on Nov. 17, 2020. For all purposes under the law, the entire disclosure of the aforementioned application is incorporated by reference as part of the disclosure of this application.

TECHNICAL FIELD

The disclosed technology relates to a device for supplying bolts, and more particularly, to a device for supplying bolts capable of automatically supplying bolts to a desired position in various postures by using a robot.

BACKGROUND

In general, bolts are used to fasten two objects and are used in various industrial fields such as automobile manufacturing processes. There are various systems for automatically supplying bolts in such an automated manufacturing system, and two typical methods will be described below as examples.

As one example, in a conventional bolt supply system, bolts randomly supplied from a parts feeder are aligned one by one, picked up by a driver bit, and then transferred to a destination to perform a driving operation. However, this bolt supply system has a problem that the radius of the robot becomes farther as the robot moves up to the location of bolts coming in alignment out of the parts feeder, and the working speed and productivity are reduced.

As another example, a conventional bolt supply system is of a method in which a bolt supplied from a parts feeder is fed through a hose in a shooting manner using air, and when the bolt enters the Y chuck, the driver bit descends to perform bolting. However, this bolt supply system has a problem that various interference problems and troubles occur because the hose is coupled to a robot arm and follows around.

BRIEF SUMMARY

Various implementations of the disclosed technology provides a device for supplying bolts having an improved bolt supply mechanism so as to enhance work speed and productivity as well as to prevent various interferences and troubles caused by driving a robot.

In one aspect, a device for supplying bolts is provided to comprise a rotary magazine that indexes a plurality of bolts; and a nut runner having a driving bit that picks up a bolt in the rotary magazine one by one and performs a driving operation, wherein the rotary magazine has a turret that houses a plurality of bolts in a circumferential direction and positions a bolt in the nut runner by rotation.

In another aspect, a device for supplying bolts is provided to comprise: a rotary magazine configured to receive a plurality of bolts; a nut runner having a driving bit configured to pick up a bolt in the rotary magazine; and a robot module disposed on a side of the rotary magazine and configured to operate to transfer the rotary magazine toward the nut runner while the nut runner and the driving bit are stationary.

In some implementations, the device for supplying bolts comprises a robot module that rotates the turret and transfers the rotary magazine toward the nut runner.

In some implementations, the robot module comprises: a rotation motor that is connected to a center hole of the turret and rotates the turret; and a z-axis transfer unit that moves the rotation motor in a z-axis direction and thereby transfers the rotary magazine toward the driving bit.

In some implementations, the robot module further has an x-axis transfer unit that moves the z-axis transfer unit in a direction orthogonal to the z-axis and thereby transfers the rotary magazine toward the driving bit.

In some implementations, the rotary magazine has a housing for rotatably supporting the turret, and a cutout for allowing the driving bit to pass therethrough is formed in the housing.

In some implementations, a clamping protrusion is formed on at least one side in the axial direction of the housing, and there is provided a clamp cylinder that inserts the clamping protrusion into the robot module and thereby engages and disengages the clamping protrusion.

In some implementations, receiving cavities for housing the bolts are formed as receded along the circumferential periphery of the turret, and the receiving cavities have a cross-sectional area larger than that of a bolt body and smaller than that of a bolt head.

In some implementations, magnets for fixing the bolt body are provided on the side of the receiving cavities.

In some implementations, the device for supplying bolts comprises a magazine shuttle capable of engaging a plurality of rotary magazines on a side opposite to the robot module in the axial direction of the rotary magazine, wherein the magazine shuttle rotates the turret and engages a rotary magazine filled with bolts or a rotary magazine unfilled with bolts.

In some implementations, the magazine shuttle has a shuttle motor connected to the center hole of the turret to rotate the turret, the rotary magazine has a housing for rotatably supporting the turret, clamping protrusions are formed on both sides in the axial direction of the housing, the magazine shuttle has a shuttle clamp cylinder that inserts the clamping protrusions and thereby engages and disengages the clamping protrusions, and the shuttle motor and the shuttle clamp cylinder are provided in a plurality of pairs.

In some implementations, the device for supplying bolts further has a shuttle transfer unit that moves the magazine shuttle and thereby transfers the rotary magazine to a parts feeder that aligns and supplies bolts.

In some implementations, if the number of bolts to be loaded in the rotary magazine is n, then the number of the receiving cavities is n+1.

In some implementations, the driving bit rotates itself when engaging a bolt head and meshes with the bolt head.

In another aspect, a method for supplying bolts is provided. The method comprises: configuring a rotary magazine to receive a plurality of bolts; and picking up a bolt in a rotary magazine using a nut runner having a driving bit, wherein the rotary magazine comprises a turret configured to house the plurality of bolts in a circumferential direction of the turret and position a bolt in the nut runner by rotation.

In some implementations, the method further comprises: moving another rotary magazine unfilled with bolts and clamping the another rotary magazine unfilled with bolts to a magazine shuttle with which the rotary magazine is engaged; and clamping the rotary magazine with bolts to a robot module configured to rotate the turret.

The device and the method for supplying bolts in accordance with the disclosed technology can shorten the stroke distance associated with the operation and reduce the cycle time, thereby greatly improving the working speed and productivity, through the configuration of the rotary magazine and as the bolt supply is performed through the operation of the robot module while the nut runner and the driving bit are stationary.

In addition, the device and method for supplying bolts in accordance with the disclosed technology can perform bolt supply in various postures without being restricted by the robot posture through the optimized structure of the rotary magazine, and is a very useful invention that can effectively prevent various interferences and troubles caused by driving a robot.

DETAILED DESCRIPTION OF THE PREFERRED EMBODIMENTS

Hereinafter, the technical construction of a device and a method for supplying bolts will be described in detail according to the accompanying drawings as follows.

Figure 1:
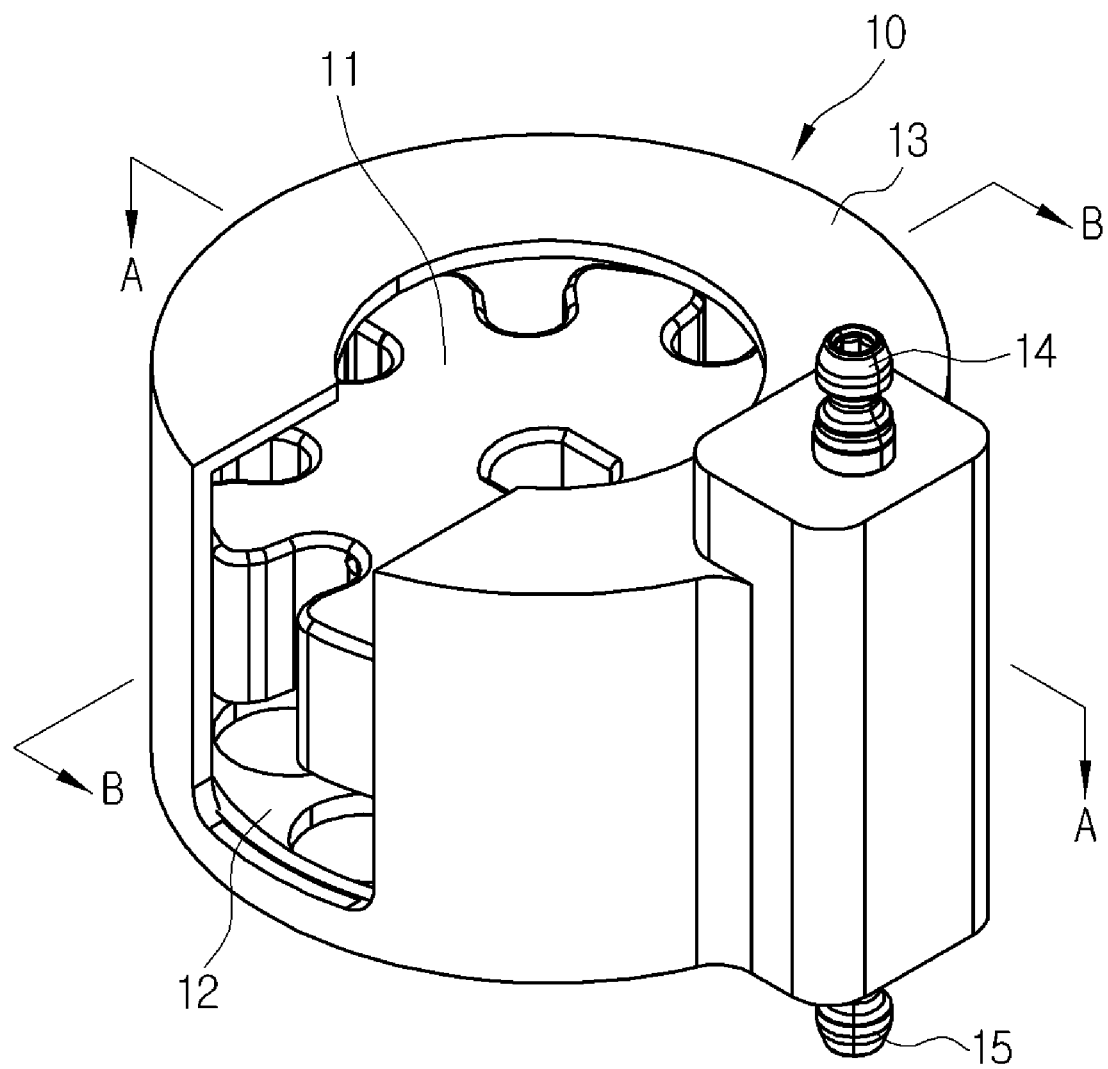
FIG. 1 is a perspective view showing a rotary magazine in accordance with one embodiment of the disclosed technology.
Figure 2:
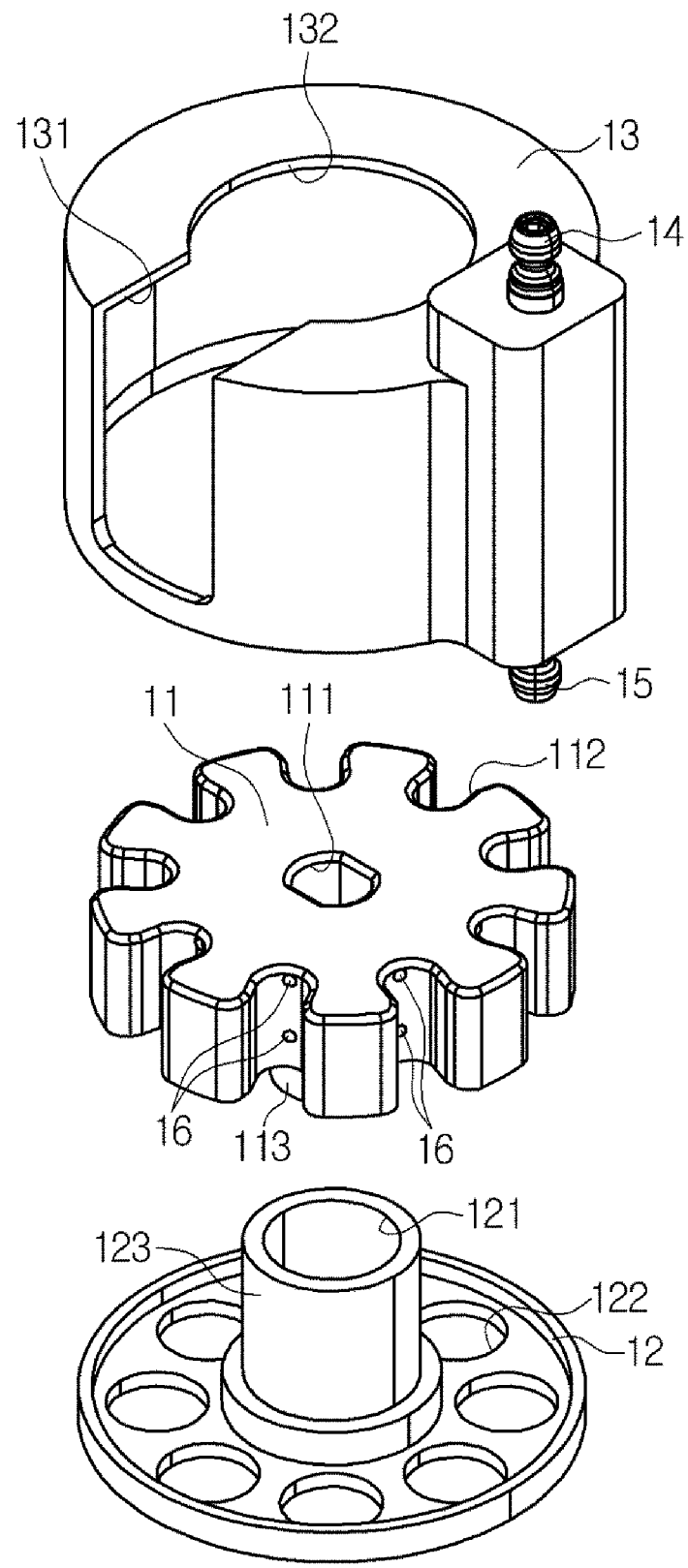
FIG. 2 is an exploded perspective view of FIG. 1.
Figure 3:
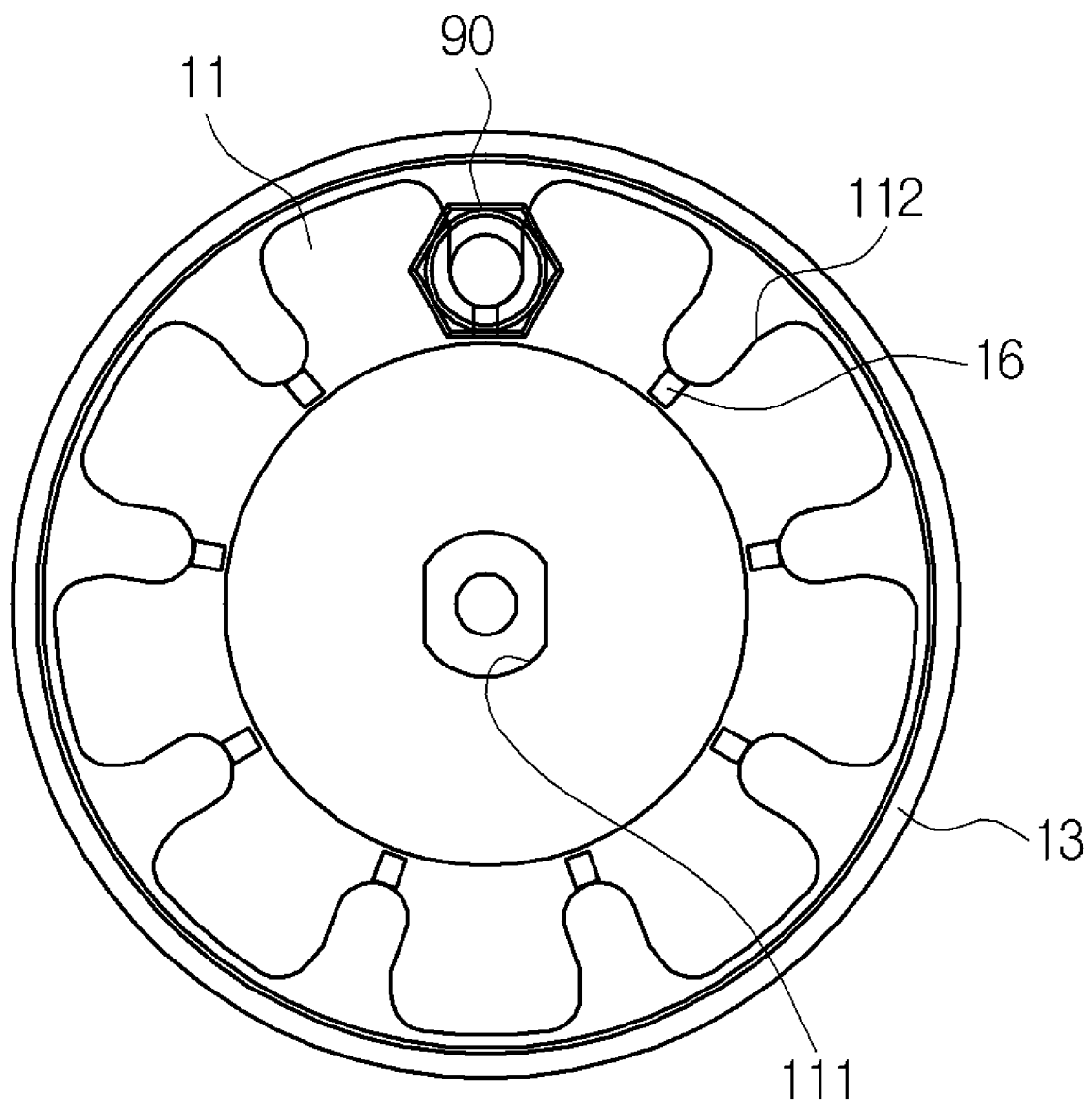
FIG. 3 is a cross-sectional view taken along line A-A of FIG. 1.
Figure 4:
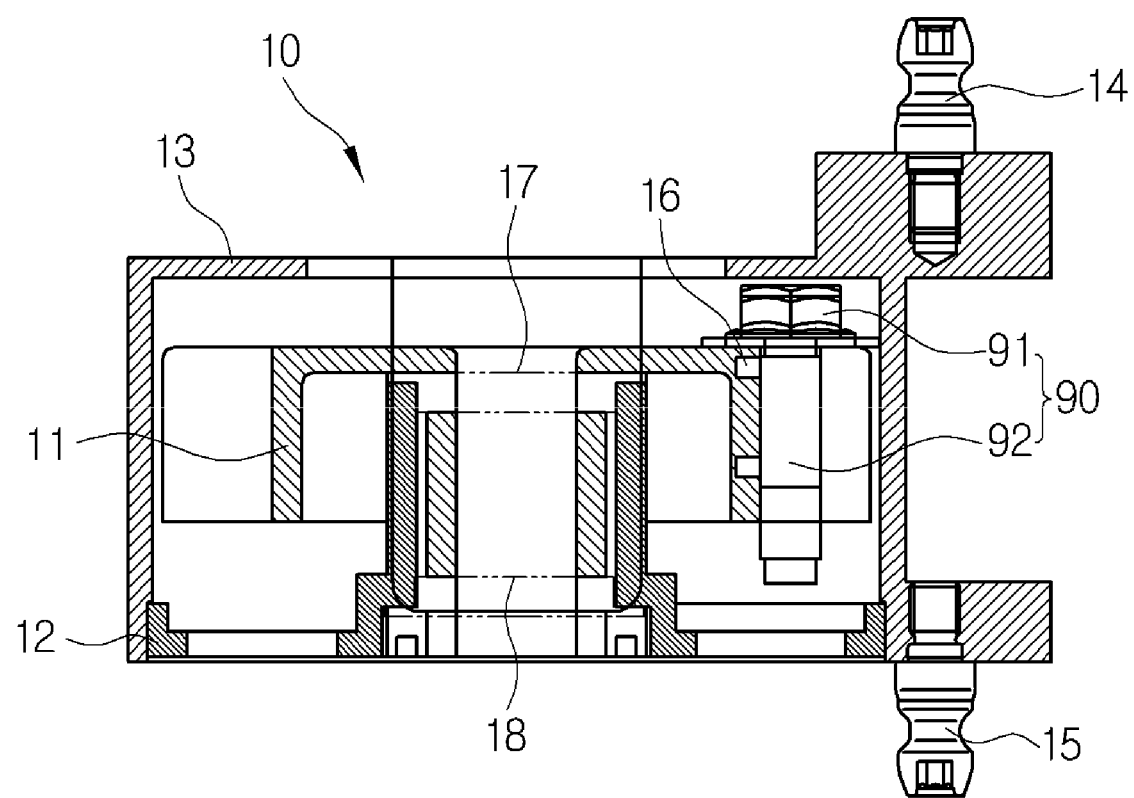
FIG. 4 is a cross-sectional view taken along line B-B of FIG. 1.
Figure 5:
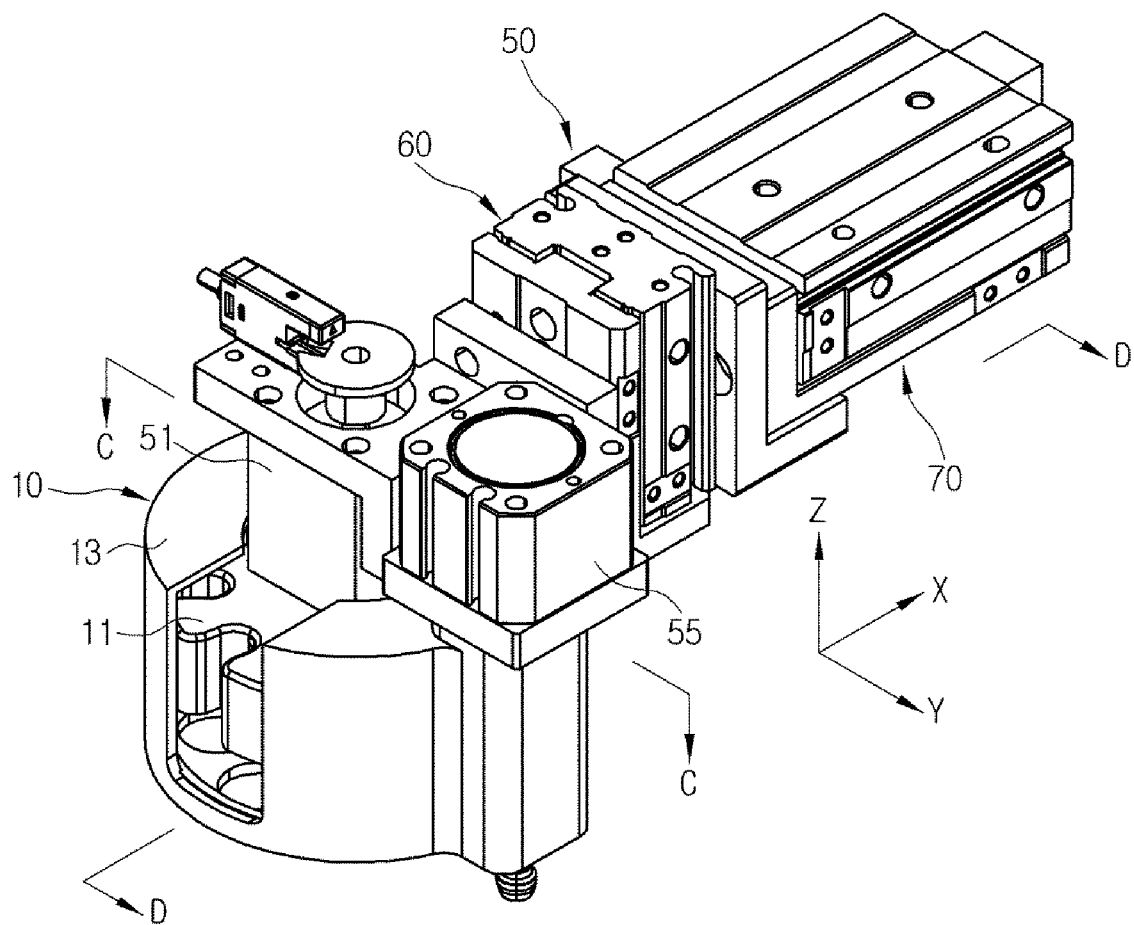
FIG. 5 is a perspective view showing a coupled state of a rotary magazine and a robot module in accordance with one embodiment of the disclosed technology.
Figure 6:
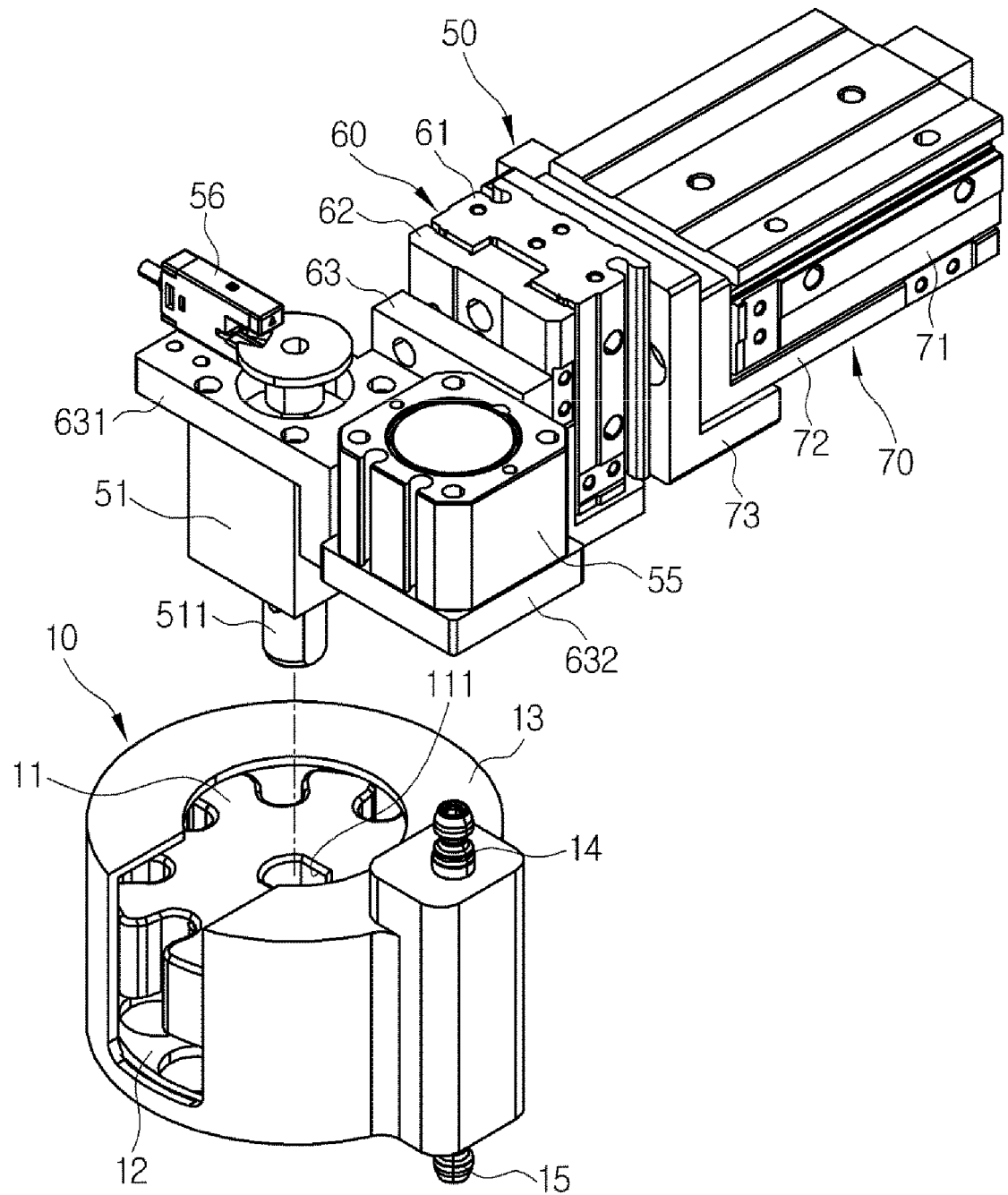
FIG. 6 is an exploded perspective view of FIG. 5.
Figure 7:
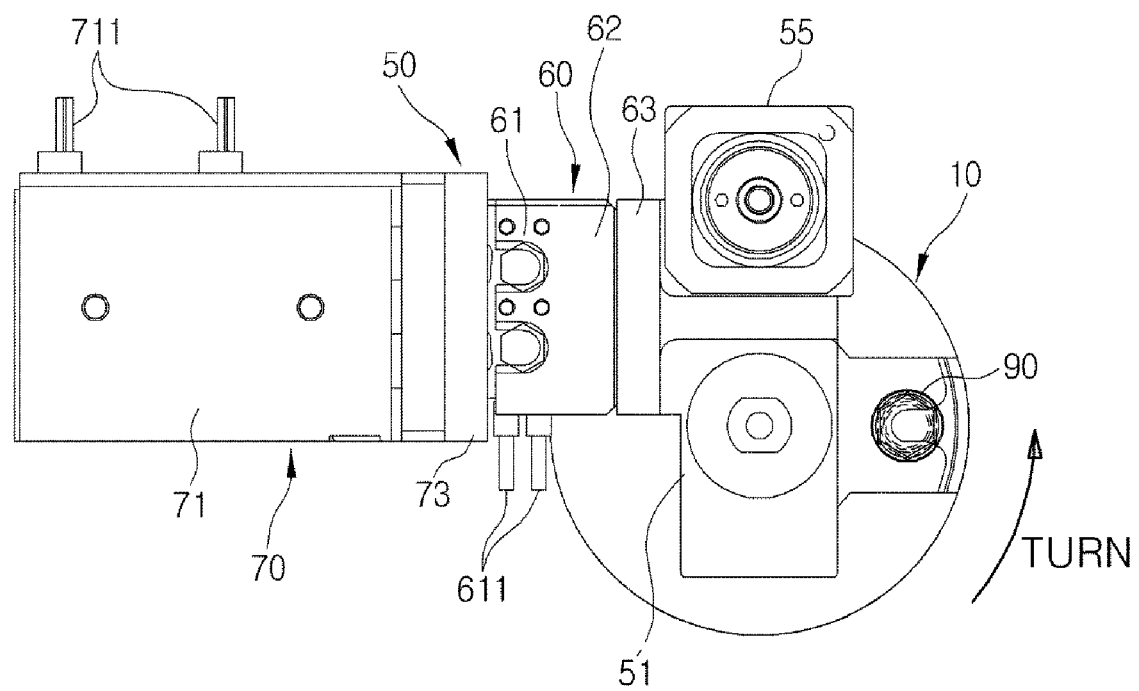
FIG. 7 is a cross-sectional view taken along line C-C of FIG. 5.
Figure 8:
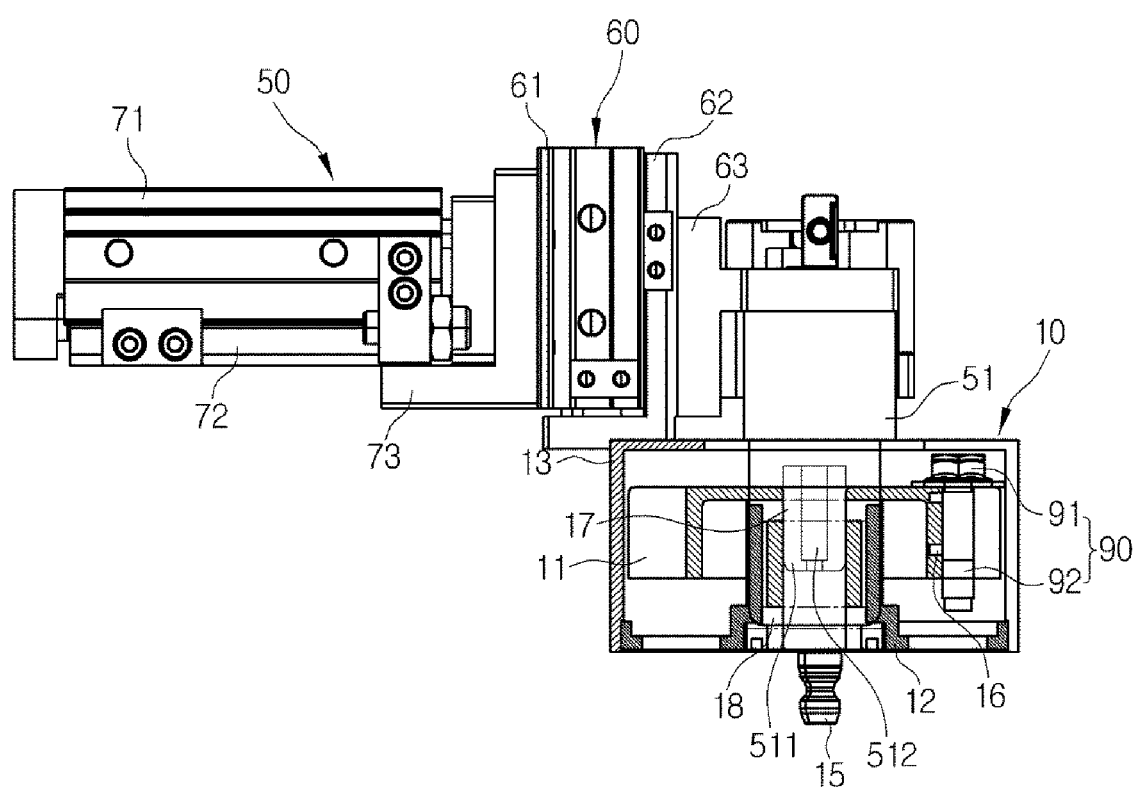
FIG. 8 is a cross-sectional view taken along line D-D of FIG. 5.
Figure 9:
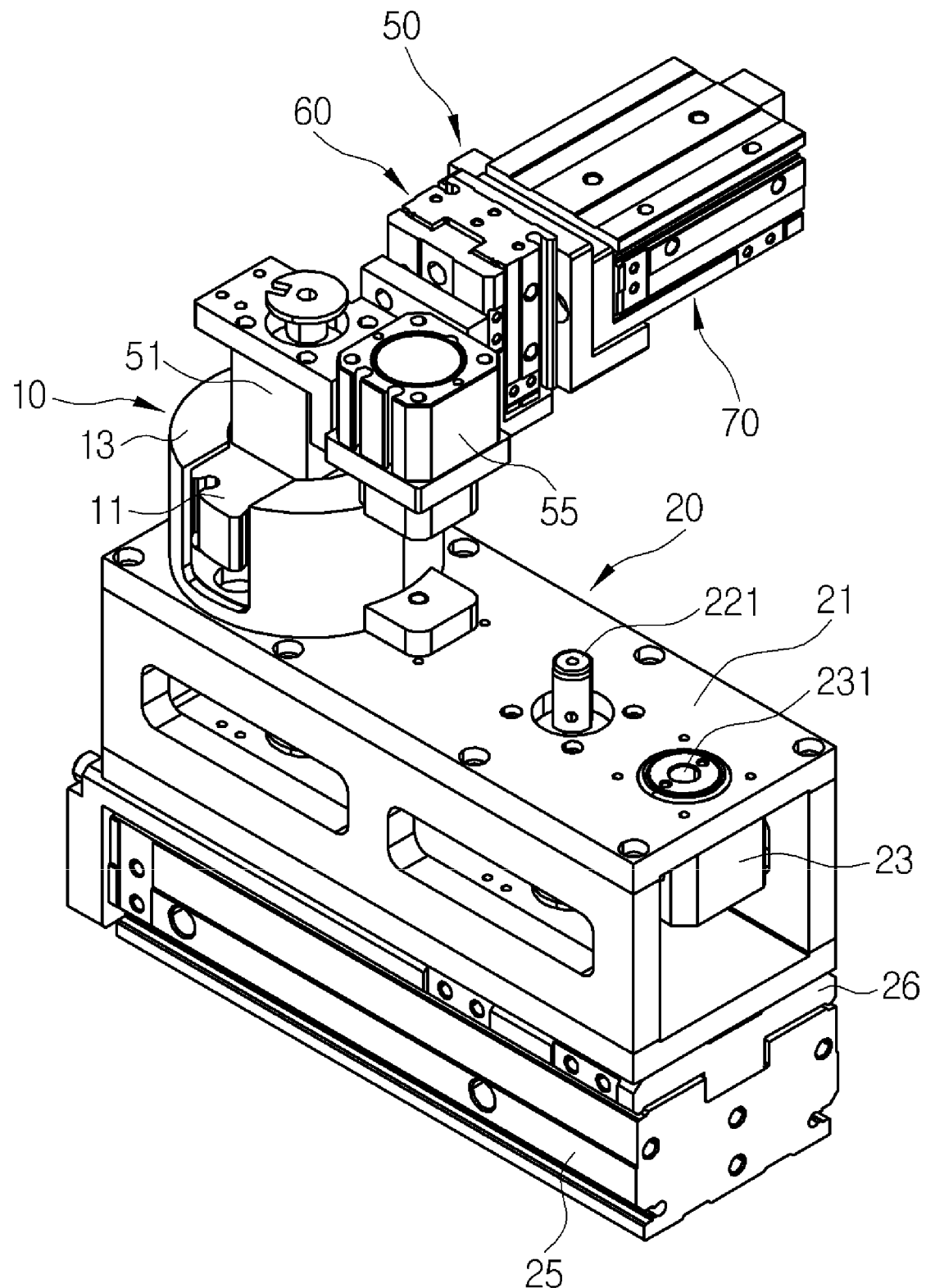
FIG. 9 is a perspective view showing a magazine shuttle in accordance with one embodiment of the disclosed technology.
Figure 10:
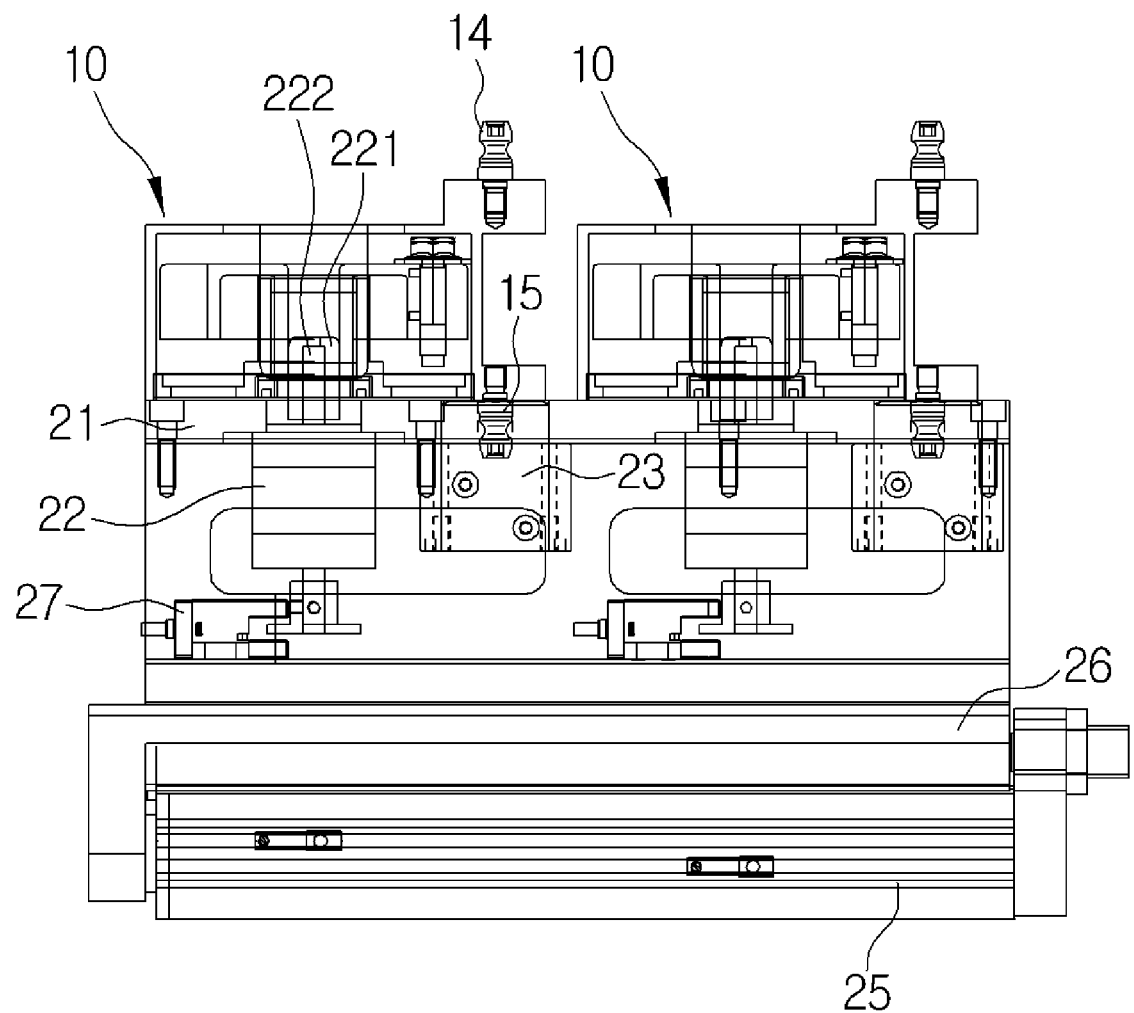
FIG. 10 is a front view showing a magazine shuttle in accordance with one embodiment of the disclosed technology.

Referring to FIGS. 1 to 16, a device for supplying bolts in accordance with one embodiment of the disclosed technology comprises a rotary magazine 10, a nut runner 30, a robot module 50, and a magazine shuttle 20. In the following description, it is the z-axis direction in FIG. 5 that is the up-down direction. However, x, y, and z directions are arbitrarily set for the convenience of description, and the directions may vary depending on installation environments.

The rotary magazine 10 has a turret 11, a housing 13, and clamping protrusions 14 and 15, and is made to index a plurality of bolts 90. The rotary magazine 10 is implemented to be loadable with a plurality of bolts 90, and be attachable to the robot module 50 or the magazine shuttle 20 and portable. The bolts 90 loaded in the rotary magazine 10 are configured to be supplied to the nut runner 30 one by one.

The turret 11 houses a plurality of bolts 90 in the circumferential direction, and functions to position the bolts 90 in the nut runner 30 by rotation. The turret 11 is formed in the shape of a circular plate having a certain thickness in the z-axis direction. Receiving cavities 112 are formed as receded from the side surface of the turret 11 along the circumferential periphery of the turret 11. For example, the receiving cavities 112 recede to a center of the turret 11. The receiving cavities 112 are formed to pass through both sides of the turret 11 in the z-axis direction, and receive the bolts 90 by inserting them. A bolt 90 comprises a bolt head 91 and a bolt body 92.

The receiving cavities 112 are made to have a cross-sectional area larger than that of the bolt body 92 but smaller than that of the bolt head 91. When a bolt 90 is loaded in the rotary magazine 10, the bolt body 92 is inserted into the receiving cavity 112 and the bolt head 91 straddles the upper surface of the turret 11. The number of receiving cavities 112 may be appropriately increased or decreased depending on the capacity, size, and the like of the rotary magazine 10, and may be implemented in various ways, such as in the number of 2, 4, 6, 8, 10, 12, 16, and 24.

If the number of bolts 90 to be loaded in the rotary magazine 10 is n, then the number of receiving cavities 112 is preferably n+1. In the present embodiment, the number of bolts 90 to be loaded in the rotary magazine 10 is eight (8), and the number of the receiving cavities 112 is nine (9). In this way, by configuring to have one more extra receiving cavity 112 than the number of bolts 90 to be loaded, in an environment in which work is done while the rotary magazine 10 is hung upside down, the empty receiving cavity 112 in which the bolt 90 is not loaded is placed in the cutout 131 of the housing 13, so that the bolts 90 are prevented from falling by being blocked by the housing 13.

Magnets 16 having a magnetic force are provided on the sides of the receiving cavities 112. The magnets 16 fix the bolt body 92 by magnetic force, and release the fixed state when a certain level of force or higher is applied. The magnets 16 may be coupled to the turret 11 by forming recesses on the side of the receiving cavities 112 and inserting them into the recesses. The magnets 16 temporarily fix the bolt 90 in a range of a certain force or lower, thereby preventing the bolt 90 from rotating idly when the driving bit 31 rotates for engagement with the bolt head 91.

A support shaft 113 is extended from and formed at the bottom of the turret 11, and the support shaft 113 is rotationally supported by a base plate 12. A center hole 111 is formed at the center of the turret 11 in the radial direction to pass through in the z-axis direction. The center hole 111 is formed in a non-circular shape, and is of a shape obtained by cutting both sides of a circle. The center hole 111 has an engagement key 511 of a rotation motor 51 and an engagement key 221 of a shuttle motor 22 to be described later inserted therein, and constrains each of them in the rotational direction. The turret 11 is rotated by a certain angle each time by the rotational force of the rotation motor 51 or the shuttle motor 22.

The housing 13 serves as a case for covering the turret 11, and the base plate 12 is fastened to the bottom thereof in the z-axis direction, thereby forming a substantially cylindrical shape. A cutout 131 is formed in the housing 13 to allow the driving bit 31 to pass therethrough. Through the cutout 131, the bolts 90 are loaded in or removed from the rotary magazine 10. In other words, the bolts 90 may be removed only through the cutout 131 in a state in which the bolts 90 are loaded in the turret 11, and the bolts 90 that are not located in the cutout 131 are blocked by the housing 13. An opening hole 132 is formed in the upper surface of the housing 13 so that the engagement key 511 of the rotation motor 51 can be inserted into the center hole 111 of the turret 11.

The support shaft 113 of the turret 11 is rotatably inserted into a support hole 121 formed in a boss 123 extending upward in the z-axis direction from the base plate 12, so that the housing 13 rotatably supports the turret 11. The rotary magazine 10 has bushings 17 and 18 for rotatably connecting the turret 11 on both sides of the turret 11 in the z-axis direction. A plurality of lightening holes 122 may be formed in the base plate 12 to reduce weight and enhance structural strength.

The clamping protrusions 14 and 15 are formed on at least one side in the axial direction of the housing 13, and in the present embodiment, a pair of clamping protrusions 14 and 15 are formed on both sides in the z-axis direction of the housing 13. The clamping protrusion 14 formed on one side (upper side) of the housing 13 is clamped to a clamp cylinder 55 provided in the robot module 50, and the clamping protrusion 15 formed on the other side (lower side) is clamped to a shuttle clamp cylinder 23 provided in the magazine shuttle 20.

The nut runner 30 is what picks up the bolts 90 loaded in the rotary magazine 10 one by one, transfers them to a desired work place, and performs bolting work or the like, and has a driving bit 31. The driving bit 31 picks up the bolts 90 in the rotary magazine 10 one by one and performs a driving operation. The driving bit 31 rotates itself when engaging the bolt head 91 and meshes with the bolt head 91. At this time, the bolt 90 is temporarily fixed to the magnets 16 provided in the turret 11, so that the bolt 90 does not rotate idly and the bolt head 91 is inserted into the driving bit 31.

The robot module 50 rotates the turret 11 and transfers the rotary magazine 10 toward the nut runner 30, and has an x-axis transfer unit 70, a z-axis transfer unit 60, a rotation motor 51, and a clamp cylinder 55. The robot module 50 consists of the x-axis transfer unit 70, z-axis transfer unit 60, rotation motor 51, and clamp cylinder 55 in one module, and may be fixedly installed on the main body where the nut runner 30 is installed, or may be fixedly installed in place in another working space.

The x-axis transfer unit 70 moves the z-axis transfer unit 60 in a direction orthogonal to the z-axis, to transfer the rotary magazine 10 toward the driving bit 31. In this case, the direction orthogonal to the z-axis may be the x-axis direction or the y-axis direction. In other words, the x-axis transfer unit 70 may transfer the rotary magazine 10 in the x-axis direction, in the y-axis direction, or in both the x-axis and y-axis directions. In addition, it is also possible to implement the x-axis transfer unit 70 so as to transfer the rotary magazine 10 in a straight line, or to move it curvedly depending on an installation environment or a work environment.

The x-axis transfer unit 70 has an x-axis transfer cylinder 71 and an x-axis transfer block 72. The x-axis transfer block 72 is connected to the x-axis transfer cylinder 71 to be slidable in the x-axis direction. The x-axis transfer cylinder 71 has air inlet and outlet ports 711 on one side, and moves the x-axis transfer block 72 forward or backward in the x-axis direction by pneumatic pressure. In addition, a fastening bracket 73 is coupled to the x-axis transfer block 72, and the x-axis transfer block 72 and the fastening bracket 73 are reciprocated in one piece.

The z-axis transfer unit 60 moves the rotation motor 51 in the z-axis direction, to transfer the rotary magazine 10 toward the driving bit 31. The z-axis transfer unit 60 has a z-axis transfer cylinder 61 and a z-axis transfer block 62. The z-axis transfer block 62 is connected to the z-axis transfer cylinder 61 to be slidable in the z-axis direction. The z-axis transfer cylinder 61 has air inlet and outlet ports 611 on one side, and moves the z-axis transfer block 62 forward or backward in the z-axis direction by pneumatic pressure.

In addition, a fastening bracket 63 is coupled to the z-axis transfer block 62, and the z-axis transfer block 62 and the fastening bracket 63 are reciprocated in one piece. A motor bracket 631 for fixing the rotation motor 51 and a cylinder bracket 632 for fixing the clamp cylinder 55 are coupled to the fastening bracket 63 in one piece. A sensor 56 for sensing the correct position of the rotation motor 51 may be installed at the top of the motor bracket 631. The sensor 56 may be usefully used to feed the information on the correct position back if the rotation motor 51 is configured by a stepping motor.

The rotation motor 51 is coupled to the motor bracket 631 and is moved in the z-axis direction together with the z-axis transfer block 62 in one piece. The rotation motor 51 is connected to the center hole 111 of the turret 11, so as to rotate the turret 11 by a certain angle each time. The engagement key 511 engages the rotating shaft 512 of the rotation motor 51. The rotating shaft 512 and the engagement key 511 may be fastened to each other by fastening screws in a direction orthogonal to the axial direction. When the z-axis transfer block 62 is lowered, the engagement key 511 of the rotation motor 51 is inserted into the center hole 111 of the turret 11, and when the z-axis transfer block 62 is raised, the engagement key 511 of the rotation motor 51 is separated from the center hole 111 of the turret 11.

The clamp cylinder 55 is coupled to the cylinder bracket 632 and is moved in the z-axis direction together with the z-axis transfer block 62 in one piece. The clamp cylinder 55 is spaced apart in the y-axis direction from the rotation motor 51 and is arranged in a line therewith. In addition, the clamp cylinder 55 serves to engage and disengage the clamping protrusion 14 when the clamping protrusion 14 of the rotary magazine 10 is inserted into the robot module 50. When the z-axis transfer block 62 is lowered, the clamping protrusion 14 is inserted into a clamp depression formed in the clamp cylinder 55, and the clamp cylinder 55 operates to fix the clamping protrusion 14. Conversely, when the clamp cylinder 55 operates to release the fixed state of the clamping protrusion 14 and then the z-axis transfer block 62 is raised, the clamping protrusion 14 is separated from the clamp depression of the clamp cylinder 55.

The magazine shuttle 20 is made to be capable of engaging a plurality of rotary magazines 10 on the side opposite to the robot module 50 in the axial direction of the rotary magazine 10. In addition, the magazine shuttle 20 functions to rotate the turret 11 and to engage the rotary magazine 10 filled with the bolts 90 or the rotary magazine 10 without the bolts. The magazine shuttle 20 comprises a main body 21, a shuttle motor 22, a shuttle clamp cylinder 23, and a shuttle transfer unit 25.

The main body 21 is coupled to the top of the shuttle block 26. The shuttle motor 22 is coupled to the main body 21 and is connected to the center hole 111 of the turret 11 to rotate the turret 11. An engagement key 221 is coupled to a rotating shaft 222 of the shuttle motor 22. The rotating shaft 222 and the engagement key 221 may be fastened to each other by fastening screws in a direction orthogonal to the axial direction.

When the z-axis transfer block 62 of the robot module 50 to which the rotary magazine 10 is coupled is lowered, the engagement key 221 of the shuttle motor 22 is inserted into the center hole 111 formed at the bottom of the turret 11. Conversely, when the z-axis transfer block 62 of the robot module 50 to which the rotary magazine 10 is coupled is raised, the engagement key 221 of the shuttle motor 22 is separated from the center hole 111 formed at the bottom of the turret 11. A sensor 27 for sensing the correct position of the shuttle motor 22 may be installed on one side of the shuttle motor 22. The sensor 27 may be usefully used to feed the information on the correct position back if the shuttle motor 22 is configured by a stepping motor.

The shuttle clamp cylinder 23 is coupled to the main body 21, and is spaced apart in the y-axis direction from the shuttle motor 22 and is arranged in a line therewith. The shuttle clamp cylinder 23 inserts the clamping protrusion 15 of the rotary magazine 10 into the magazine shuttle 20, thereby engaging and disengaging the clamping protrusion 15. The shuttle motor 22 and the shuttle clamp cylinder 23 consist of a plurality of pairs. In the present embodiment, the shuttle motor 22 and the shuttle clamp cylinder 23 consist of two pairs, and the number thereof can be appropriately increased or decreased.

When the z-axis transfer block 62 of the robot module 50 to which the rotary magazine 10 is coupled is lowered, the clamping protrusion 15 is inserted into a clamp depression 231 formed in the shuttle clamp cylinder 23, and the shuttle clamp cylinder 23 operates to fix the clamping protrusion 15. Conversely, when the shuttle clamp cylinder 23 operates to release the fixed state of the clamping protrusion 15 and then the z-axis transfer block 62 of the robot module 50 to which the rotary magazine 10 is coupled is raised, the clamping protrusion 15 is separated from the clamp depression 231 of the shuttle clamp cylinder 23.

The shuttle transfer unit 25 connects the shuttle block 26 so as to be slidable in the y-axis direction. The shuttle transfer unit 25 functions to move the magazine shuttle 20, to transfer the rotary magazine 10 to the parts feeder 40. The parts feeder 40 is configured to align random bolts 90 by a vibration method or the like, to supply them one by one to an alignment feeder, and to load the bolts 90 into the rotary magazine 10.

Now, an operation process of a device for supplying bolts in accordance with one embodiment of the disclosed technology will be described with reference to FIGS. 11 to 16.

Figure 11:
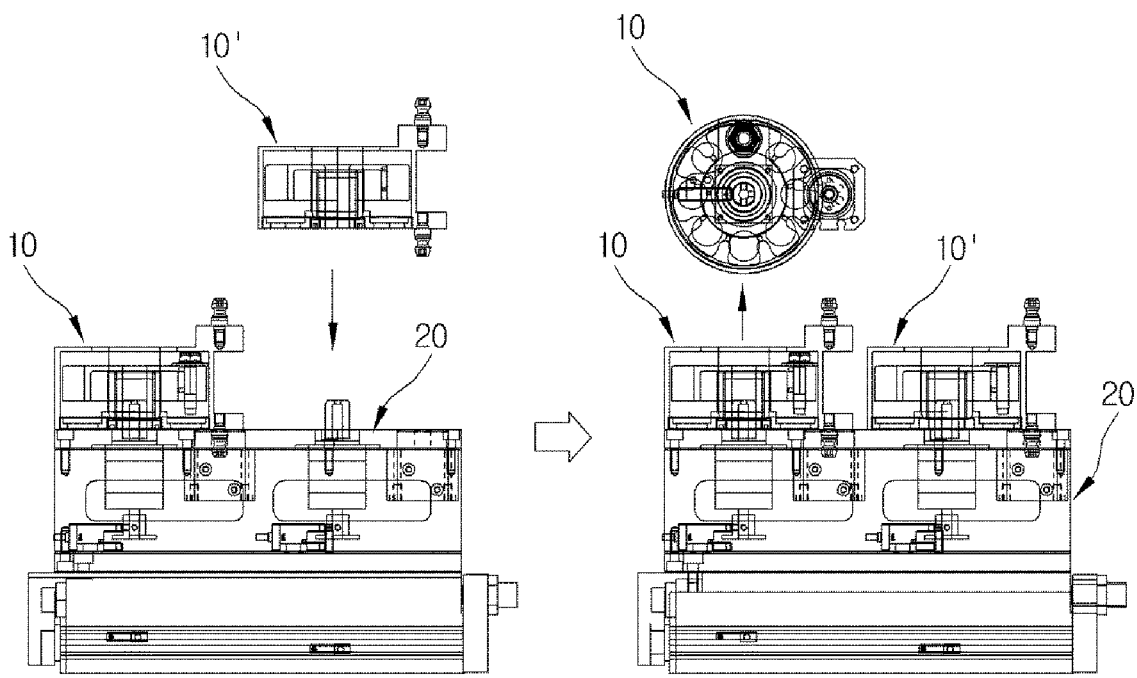
FIGS. 11 to 16 illustrate an operation process of a device for supplying bolts in accordance with one embodiment of the disclosed technology.

First, looking at the operation process of the magazine shuttle 20, the rotary magazine 10 filled with bolts is on standby at the magazine shuttle 20, as shown in FIG. 11. A rotary magazine 10' unfilled with (e.g., the rotary magazine 10 in which bolts are not filled and to be filled) is mounted to the engagement key of the shuttle motor located next to the rotary magazine 10. The rotary magazine 10' unfilled with bolts is lowered by the robot module 50, unclamped, separated from the robot module 50, and clamped to the magazine shuttle 20. After that, the robot module 50 clamps the rotary magazine 10 filled with bolts.

Figure 12:
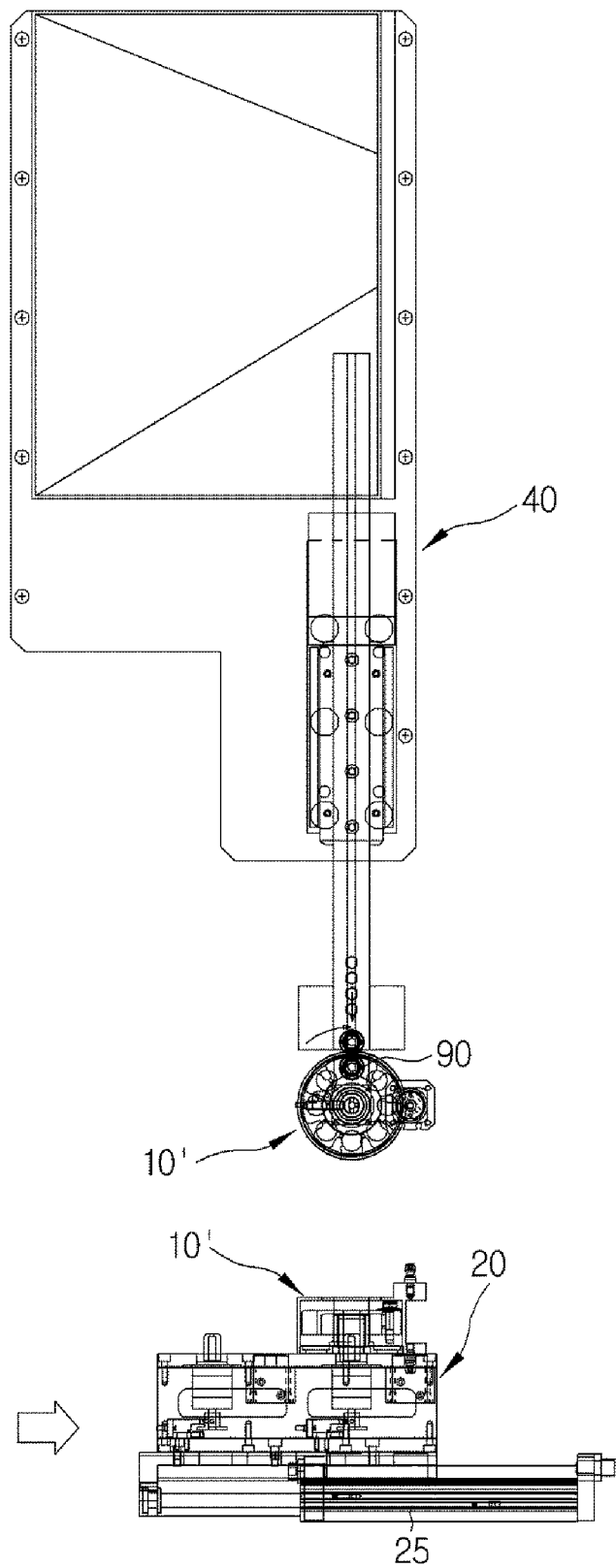

Referring to FIG. 12, the shuttle transfer unit 25 moves the magazine shuttle 20 to the location of the parts feeder 40. The rotary magazine 10' unfilled with bolts is positioned in the alignment feeder of the parts feeder 40, and is loaded with the bolts 90 supplied from the parts feeder 40 one by one. At this time, the shuttle motor 22 rotates the turret 11 by a certain angle each time, so that the bolts 90 are indexed into the turret 11 one by one.

Figure 13:
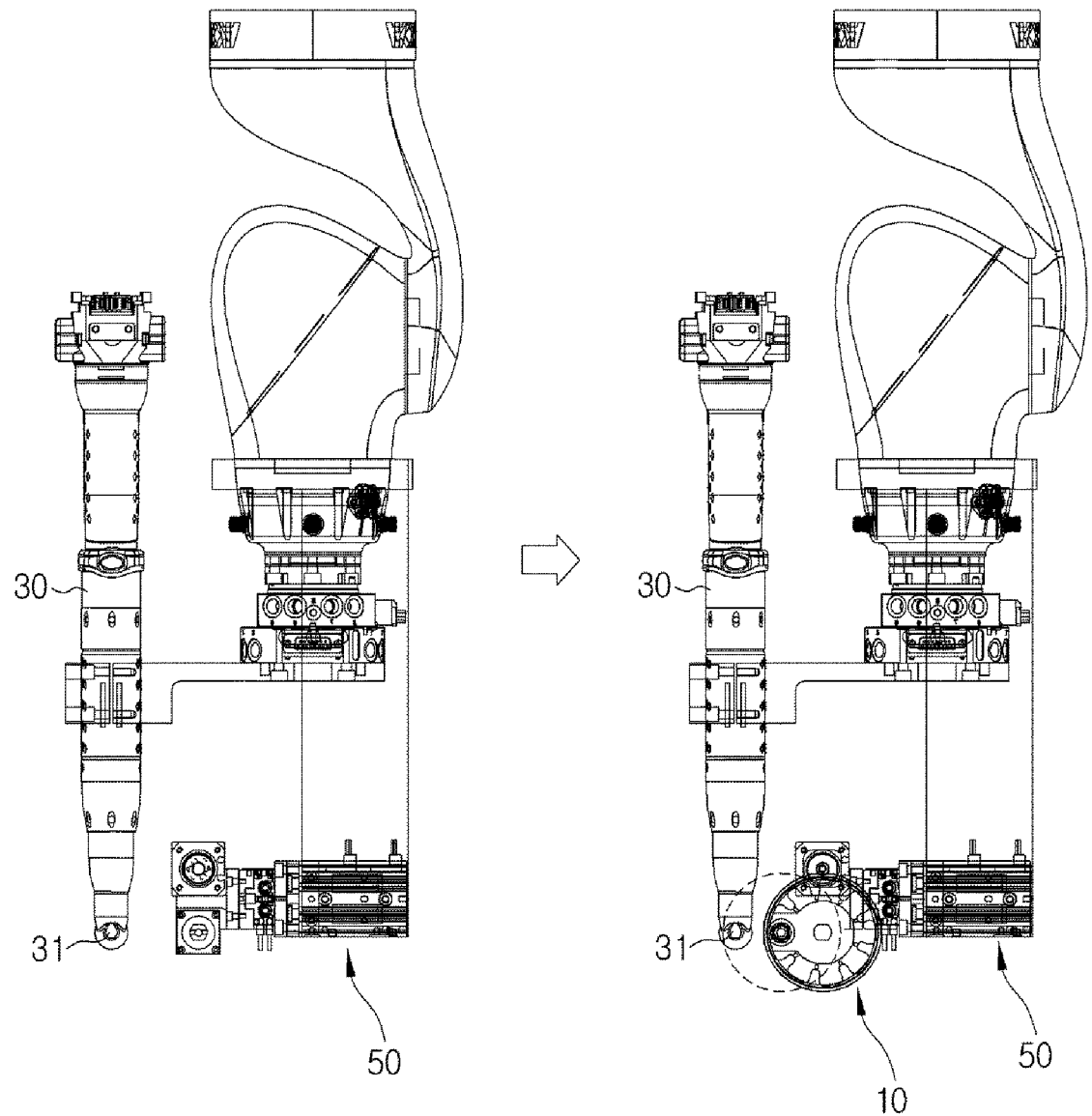
Figure 14:
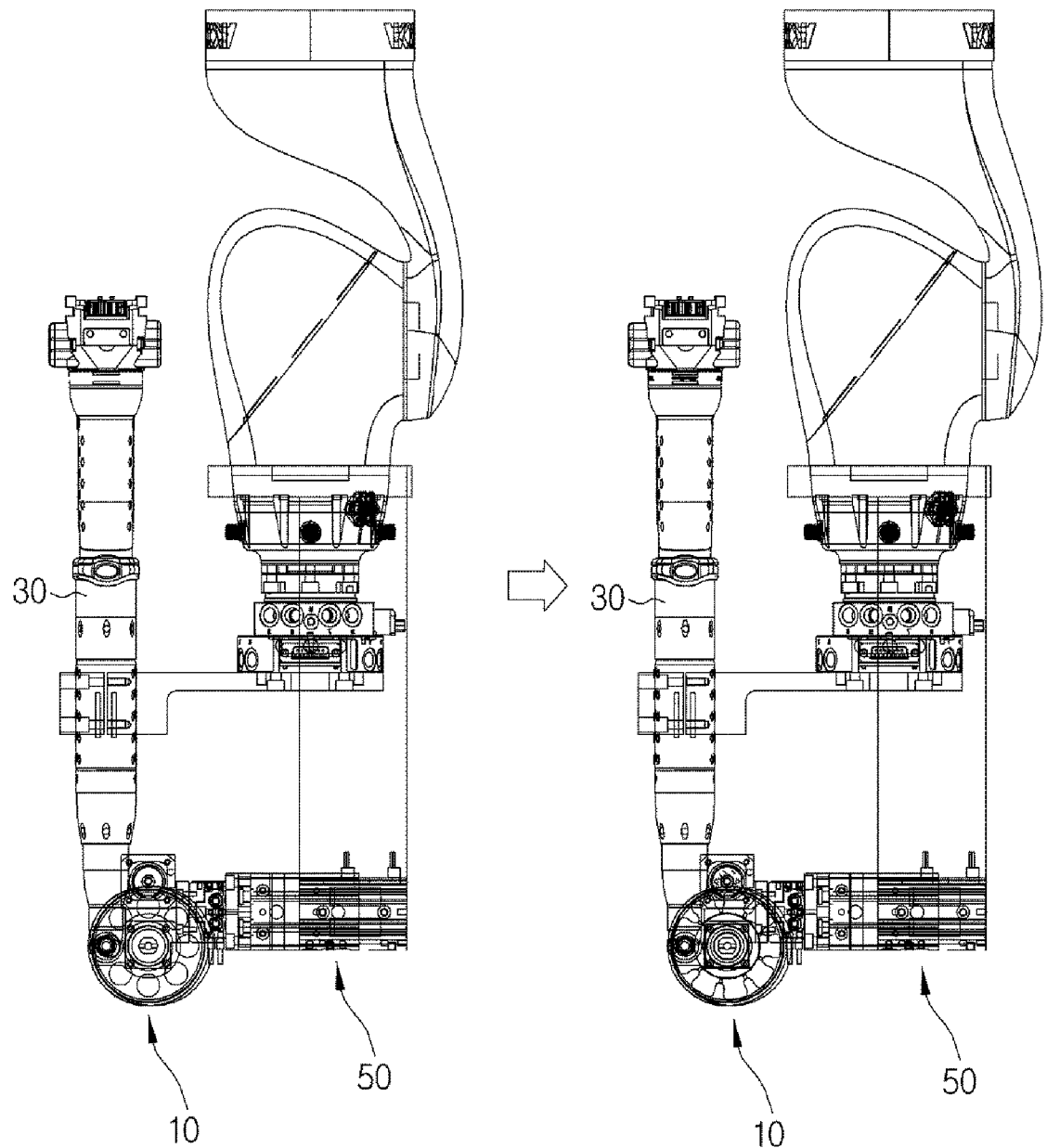

The left diagram in FIG. 13 shows a state before the rotary magazine 10 is mounted to the robot module 50, and the right diagram shows a state in which the rotary magazine 10 is mounted to the robot module 50. Referring to FIG. 14, the x-axis transfer unit 70 of the robot module 50 transfers the rotary magazine 10 toward the driving bit 31 of the nut runner 30. Thereafter, the rotation motor 51 rotates the turret 11 by a certain angle to align a bolt 90 with the position of the driving bit 31.

Figure 15:
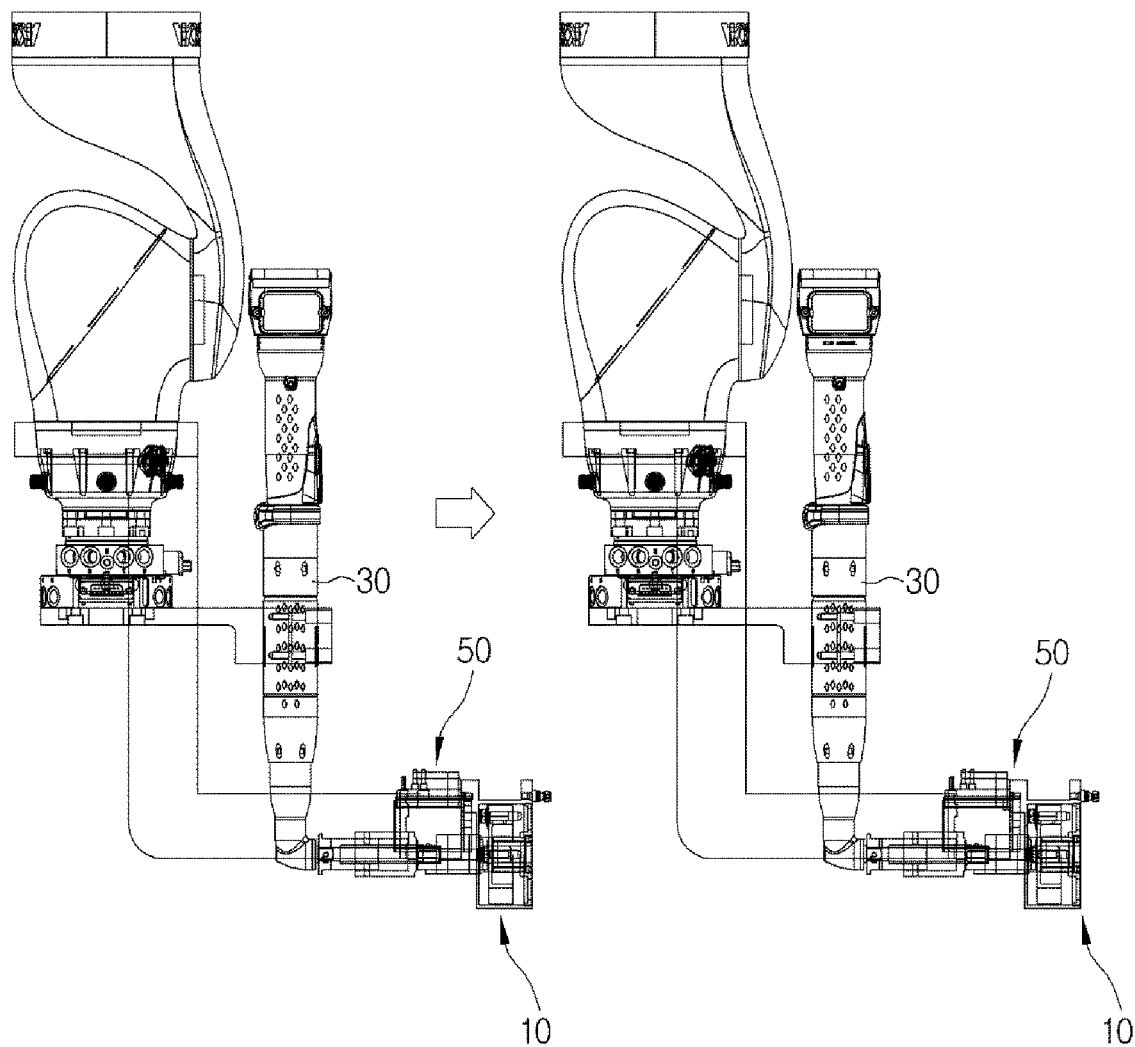

Referring to FIG. 15, along with the rotation of the driving bit 31, the z-axis transfer unit 60 moves the rotary magazine 10 forward toward the driving bit 31, to cause the bolt 90 to be inserted in and engaged with the driving bit 31. When the bolt 90 is inserted in and engaged with the driving bit 31, the z-axis transfer unit 60 moves the rotary magazine 10 back away from the driving bit 31.

Figure 16:
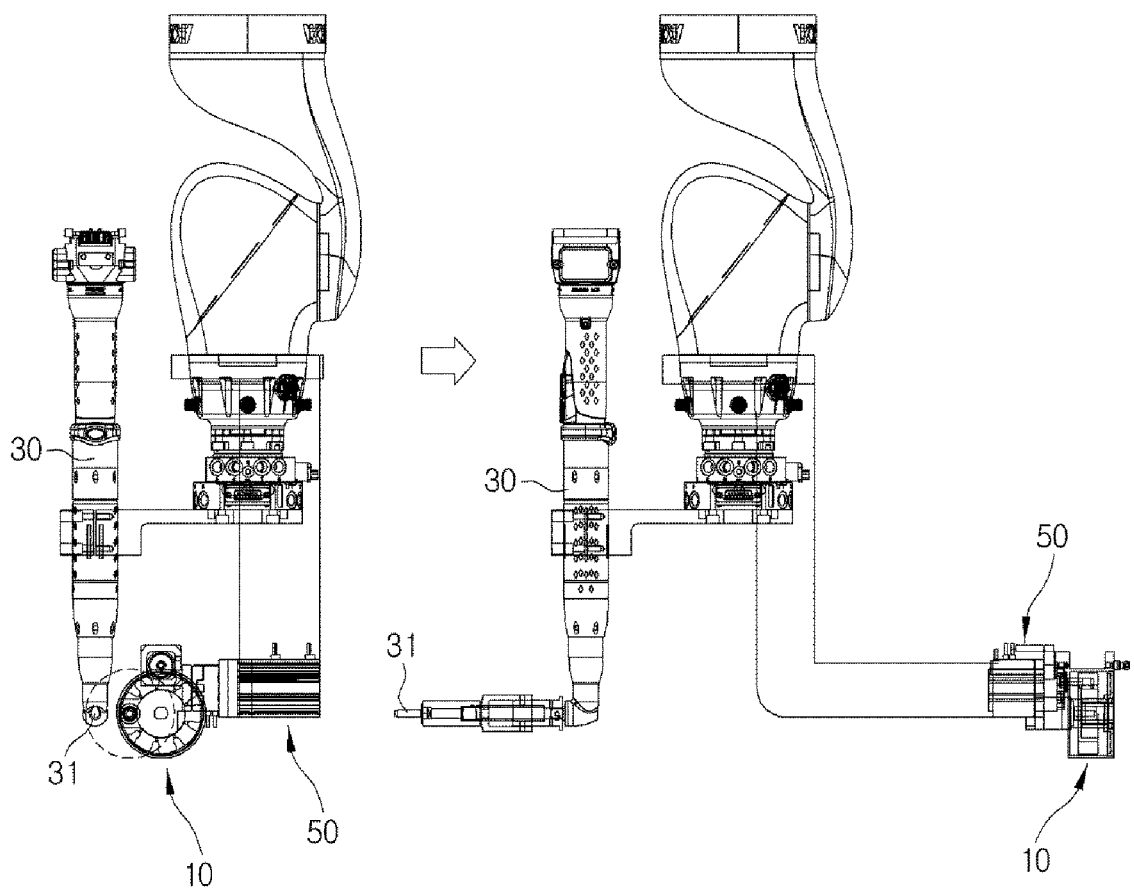

Referring to FIG. 16, the x-axis transfer unit 70 transfers the rotary magazine 10 away from the driving bit 31 of the nut runner 30. Thereafter, the nut runner 30 is inverted by 180°, and the driving operation is performed. In addition, the rotary magazine 10 unfilled with is clamped to the magazine shuttle 20 by the robot module 50 as shown in FIG. 11.

The device for supplying bolts in accordance with one embodiment of the disclosed technology can shorten the stroke distance associated with the operation and reduce the cycle time, thereby greatly improving the working speed, through the configuration of the rotary magazine 10 and as the bolt supply is performed through the operation of the robot module 50 while the nut runner 30 and the driving bit 31 are stationary. In addition, through the optimized structure of the rotary magazine 10, it is possible to perform bolt supply in various postures without being restricted by the robot posture.

The device for supplying bolts in accordance with the disclosed technology has been described with reference to the embodiments shown in the drawings, but these are merely exemplary, and it will be understood by those of ordinary skill in the art that various modifications and equivalent other embodiments are possible therefrom.

What is claimed is:

1. A device for supplying bolts, comprising:
 a rotary magazine configured to index a plurality of bolts; and
 a nut runner having a driving bit configured to pick up a bolt in the rotary magazine and to perform a driving operation,
 wherein the rotary magazine comprises a turret configured to have a plurality of receiving cavities to house the plurality of bolts in a circumferential direction of the turret and position a bolt in the nut runner by rotation, and a housing configured to at least partially cover upper ends of the plurality of bolts housed in the plurality of receiving cavities,
 wherein the device further comprises: a robot module configured to rotate the turret and to transfer the rotary magazine toward the nut runner, and
 wherein the robot module comprises:
 a rotation motor connected to a center hole of the turret and configured to rotate the turret and
 a z-axis transfer unit configured to move the rotation motor in a z-axis direction and transfer the rotary magazine toward the driving bit;
 wherein the robot module further comprises:
 an x-axis transfer unit configured to move the z-axis transfer unit in a direction orthogonal to the z-axis direction and thereby transfer the rotary magazine toward the driving bit.

2. The device of claim 1, wherein the rotary magazine further comprises:
 a cutout formed in the housing to allow the driving bit to pass therethrough.

3. The device of claim 1, wherein a clamping protrusion is formed on at least one side in an axial direction of the housing, and the device further comprises:
a clamp cylinder configured to insert the clamping protrusion into the robot module.

4. The device of claim 1, wherein the plurality of receiving cavities recede into a central portion of the turret and have a cross-sectional area larger than that of a bolt body and smaller than that of a bolt head.

5. The device of claim 4, wherein magnets for fixing the bolt body are provided on a side of the plurality of receiving cavities.

6. The device of claim 4, wherein if the number of bolts to be loaded in the rotary magazine is n, then the number of the receiving cavities is n+1.

7. The device of claim 1, further comprising:
a magazine shuttle capable of engaging a plurality of rotary magazines on a side opposite to the robot module in an axial direction of the rotary magazine,
wherein the magazine shuttle is configured to rotate the turret and to engage a rotary magazine.

8. The device of claim 7, wherein the magazine shuttle comprises a shuttle motor connected to a center hole of the turret to rotate the turret, the rotary magazine comprises a housing for rotatably supporting the turret, and clamping protrusions are formed on both sides in an axial direction of the housing, the magazine shuttle comprises a shuttle clamp cylinder configured to insert the clamping protrusions to thereby engage and disengage the clamping protrusions, and the shuttle motor and the shuttle clamp cylinder are provided in a plurality of pairs.

9. The device of claim 1, wherein the driving bit is configured to rotate itself when engaging a bolt head and mesh with the bolt head.

10. A device for supplying bolts, comprising:
a rotary magazine configured to have a plurality of receiving cavities to receive a plurality of bolts;
a housing configured to at least partially cover upper ends of the plurality of bolts received in the plurality of receiving cavities;
a nut runner having a driving bit configured to pick up a bolt in the rotary magazine; and
a robot module disposed on a side of the rotary magazine and configured to operate to transfer the rotary magazine toward the nut runner while the nut runner and the driving bit are stationary, and
wherein the rotary magazine further comprises a turret configured to house the plurality of bolts to be arranged along a circumferential direction of the turret, and
wherein the robot module comprises:
a rotation motor connected to a center hole of the turret and configured to rotate the turret; and
a z-axis transfer unit configured to move the rotation motor in a z-axis direction and transfer the rotary magazine toward the driving bit;
wherein the robot module further comprises:
an x-axis transfer unit configured to move the z-axis transfer unit in a direction orthogonal to the z-axis direction and thereby transfer the rotary magazine toward the driving bit.

11. The device of claim 10, wherein the plurality of receiving cavities is formed along a circumferential periphery of the turret to receive the plurality of bolts, the plurality of receiving cavities receding into a central portion of the turret.

12. The device of claim 10, wherein the rotary magazine further comprises:
a cutout formed in the housing to allow the driving bit to pass therethrough.

13. A method for supplying bolts, comprising:
configuring a first rotary magazine to receive a plurality of bolts; and
picking up a bolt in the first rotary magazine using a nut runner having a driving bit,
wherein the first rotary magazine comprises a turret configured to have a plurality of receiving cavities to house the plurality of bolts in a circumferential direction of the turret and position a bolt in the nut runner by rotation, and a housing configured to at least partially cover upper ends of the plurality of bolts housed in the plurality of receiving cavities, the method further comprising:
moving a second rotary magazine unfilled with bolts and clamping the second rotary magazine unfilled with bolts to a magazine shuttle with which the first rotary magazine is engaged; and
clamping the first rotary magazine with bolts to a robot module configured to rotate the turret;
wherein the robot module comprises:
a rotation motor configured to move the turret; and
an x-axis transfer unit configured to move a z-axis transfer unit in a direction orthogonal to a z-axis direction and thereby transferring the first rotary magazine toward the driving bit.

* * * * *